UNITED STATES PATENT OFFICE.

CHARLES A. SHANK, OF PHILADELPHIA, PENNSYLVANIA, ASSIGNOR OF SEVEN-EIGHTHS TO ADAM A. CATANACH, PETER BOYD, WALTER BURGE, BENJAMIN P. WILSON, AND ROBERT S. GREENFIELD, OF SAME PLACE.

ARTIFICIAL STONE OR CEMENT COMPOSITION.

SPECIFICATION forming part of Letters Patent No. 520,662, dated May 29, 1894.

Application filed February 6, 1890. Serial No. 339,456. (No specimens.)

*To all whom it may concern:*

Be it known that I, CHARLES A. SHANK, a citizen of the United States, and a resident of Philadelphia, Pennsylvania, have invented a certain Improved Artificial Stone or Cement Composition, of which the following is a specification.

The object of my invention is to produce a cheap, strong and durable artificial stone or cement composition, and this object I attain in the following manner. The composition is formed from nitric and sulphuric acids, or acid wastes, concentrated lye, water and air-slaked or fallen lime.

In making the compound, from eight to twelve pounds of nitric acid and a like amount of sulphuric acid are first thoroughly mixed together with from five to eight per cent. of their weight of concentrated lye such as caustic soda or potash and when the chemical action has ceased, one hundred gallons of water are added.

If an artificial stone composition is to be produced, the sand, clay, loam, or other base for the composition is mixed with the acid solution so as to form a plastic or semi-liquid mass, and from two to three bushels of air-slaked or fallen lime are then added to the compound and the latter is mixed until active chemical action takes place and a considerable degree of heat is generated in the mass. If the compound is intended for forming or coating walls, floors, walks or analogous purposes, it is applied in this heated condition and becomes hard and set on cooling, while if the compound is to be formed into blocks, bricks, tiles, drain pipes or other like articles, it is pressed or molded into shape while heated and then allowed to become cool so as to harden in the shape which has been given to it.

In making artificial cement in accordance with the invention, the acid compound is simply applied to the lime in such quantity as to dampen the mass without liquefying it, and while the mass is drying and cooling it is subjected to constant agitation in the presence of the air, preferably by passing it through screens or bolting reels, so as to cause it to retain its powdered form and prevent it from hardening into solid blocks or lumps.

My invention may be carried out without the use of pure sulphuric and nitric acids in the compound; for instance, I may use the impure acid compounds constituting the "sludge" or "dross" which is the waste product resulting from the manufacture of nitric or sulphuric acid, this waste, in the case of nitric acid being known as "niter cake" and in the case of sulphuric acid being known as "salt cake." For many purposes the use of this waste product is preferable, as it now has very little, if any, market value, and would consequently permit of the manufacture of the artificial stone or cement composition at very small cost, especially as the fallen lime is, in many cases, also a worthless material, resulting from the air slaking of lime while in storage. Where the acids are used in the impure form of the waste mentioned, there should be an increase of from thirty to fifty per cent. in the quantity employed, as compared with the pure acids, and the proportion of acids in the compound will generally be determined by the relative alkalinity of the bases employed in making the composition.

Having thus described my invention, I claim and desire to secure by Letters Patent—

1. An artificial stone or cement composition consisting of sulphuric and nitric acids, lye and fallen lime, substantially as specified.

2. An artificial stone composition consisting of sulphuric and nitric acids, lye, fallen lime and a suitable base, substantially as specified.

In testimony whereof I have signed my name to this specification in the presence of two subscribing witnesses.

CHAS. A. SHANK.

Witnesses:
WILLIAM D. CONNER,
HARRY SMITH.